United States Patent [19]
Bischoff

[11] Patent Number: 6,058,707
[45] Date of Patent: May 9, 2000

[54] METHOD OF CONTROLLING THE CHARGE AIR MASS FLOWS OF AN INTERNAL COMBUSTION ENGINE INCLUDING AN EXHAUST GAS TURBOCHARGER WITH ADJUSTABLE TURBINE GEOMETRY

[75] Inventor: Roland Bischoff, Plüderhausen, Germany

[73] Assignee: Daimler Chrysler AG, Stuttgart, Germany

[21] Appl. No.: 09/059,495

[22] Filed: Apr. 13, 1998

[30] Foreign Application Priority Data

Apr. 12, 1997 [DE] Germany .......................... 197 15 236

[51] Int. Cl.$^7$ ...................................................... F02D 23/00
[52] U.S. Cl. ............................................................. 60/602
[58] Field of Search ............................. 60/600, 601, 602, 60/603

[56] References Cited

U.S. PATENT DOCUMENTS

| | | | |
|---|---|---|---|
| 4,671,068 | 6/1987 | Moody et al. | 60/602 |
| 4,928,489 | 5/1990 | Inoue et al. | 60/602 |
| 5,123,246 | 6/1992 | Younessi et al. | 60/602 |

FOREIGN PATENT DOCUMENTS

| | | |
|---|---|---|
| 0 747 585 | 12/1996 | European Pat. Off. . |
| 36 24 248 | 6/1988 | Germany . |
| 40 25 901 | 1/1992 | Germany . |
| 60-022032 | 2/1985 | Japan . |
| 61-123718 | 6/1986 | Japan . |
| 61-283726 | 12/1986 | Japan . |

*Primary Examiner*—Noah P. Kamen
*Attorney, Agent, or Firm*—Klaus J. Bach

[57] ABSTRACT

In a method of controlling the charge air mass flow of an internal combustion engine having an exhaust gas turbocharger with adjustable turbine inlet guide vanes during dynamic operation of the engine from one stationary operating state with a given engine power output to another stationary engine operating state with a greater engine power output, the flow guide vanes are first moved to a closing position providing a minimum flow cross-section and, after a certain engine operating parameter reaches a certain control value, the guide vanes are opened at a rate depending on the charge air pressure in the intake duct of the engine to a final opening position corresponding to the other stationary engine operating state.

5 Claims, 2 Drawing Sheets

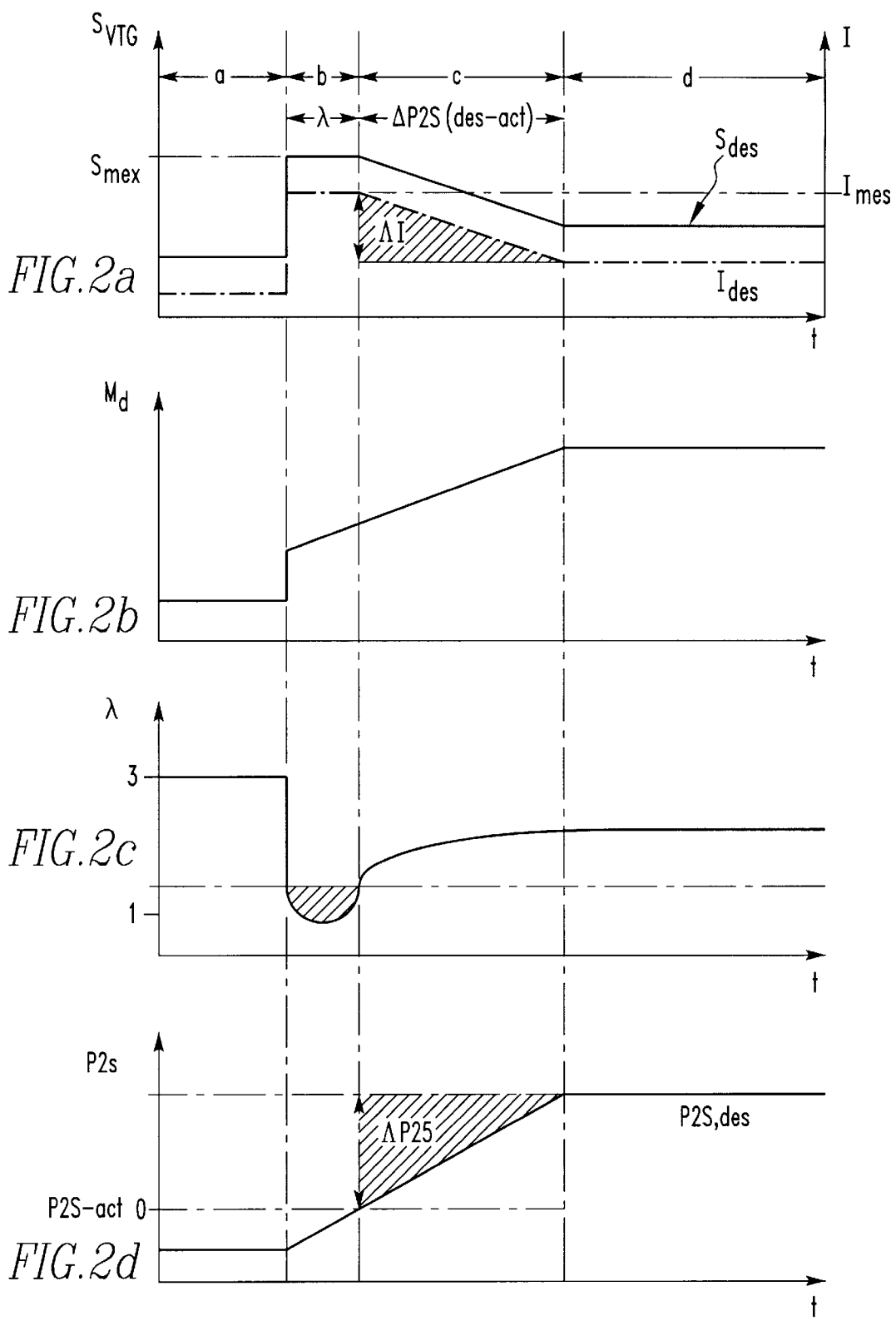

METHOD OF CONTROLLING THE CHARGE AIR MASS FLOWS OF AN INTERNAL COMBUSTION ENGINE INCLUDING AN EXHAUST GAS TURBOCHARGER WITH ADJUSTABLE TURBINE GEOMETRY

BACKGROUND OF THE INVENTION

The invention resides in a method of controlling the charge air mass flow of an internal combustion engine including an exhaust gas turbocharger with adjustable turbine geometry when, during dynamic operation, the engine load increases and the incident flow cross-section of the turbine is reduced.

The power output of an internal combustion engine is proportional to the combustion air throughput and the combustion air density. With a charger, that is, with air which is compressed before it enters the internal combustion engine, the engine power output is greater than it is with an internal combustion engine having the same combustion chamber volume at the same engine speed, but with ambient air, which is not precompressed. The air can be compressed by an exhaust gas turbocharger which consists essentially of two fluid dynamic machines. They are a turbine driven by the exhaust gas flow of an internal combustion engine and a compressor, which is driven by the turbine and precompresses the fresh air supplied to the turbine to a degree which depends on the speed of the compressor. The turbine and the compressor are interconnected by a common shaft and consequently rotate at the same speed. The charge air pressure downstream of the compressor and the exhaust gas pressure upstream of the turbine are coupled because of the momentum equilibrium at the common compressor shaft. The exhaust gas flow is backed up upstream of the turbine because of the charge air pressure effective on the compressor. The backup pressure of the exhaust gas flow is converted into a charge pressure of the charge air flow to the internal combustion engine in accordance with a pressure conversion ratio which is determined by the respective flow cross-sections of the turbine and the compressor.

With increasing power output of the internal combustion engine, an increasing charge air volume is needed so that a correspondingly greater charge air pressure has to be generated. With an adjustable turbine geometry, for example by adjustable guide vanes of the turbine, the gas admission flow cross-section of the turbine can be adjusted and, as a result, the backup pressure energy to be transferred by the exhaust gas turbocharger to the charge air flow can be controlled. The turbine geometry can be adjusted to any position between a fully open position with a maximum gas admission flow cross-section and a closed position with a minimum gas admission flow cross-section. For every operating state of the internal combustion engine, there is a turbine geometry, that is a guide vane position, providing for a specific gas admission flow cross-section, which results in a charge air flow volume providing for minimum fuel consumption of the internal combustion engine. The gas flow admission cross-section is reduced with increasing power output so that, with a correspondingly increased compressor power output, the charge air pressure and, consequently, the charge air mass flow to the internal combustion engine are adapted to the respective state of operation.

During dynamic operation of the internal combustion engine, that is during a load change from one to another operating state while the load is increasing, also the turbine geometry is correspondingly changed to a position with smaller exhaust gas admission flow cross-section. However, with a continuous closing movement of the turbine exhaust gas admission flow control vanes, the acceleration of the exhaust gas turbocharger is not sufficient for rapidly increasing the turbine power output. An excessively slow buildup of the charge air pressure during dynamic operations leads to combustion with insufficient air and, consequently, to an increased fuel consumption of the internal combustion engine and high exhaust gas emissions.

In order to accelerate the turbocharger rapidly it is known to immediately move the turbine geometry to a closing position when the load demand is increased. The minimal admission flow cross-section of the turbine then leads to a rapid increase in the exhaust gas back up pressure so that, as a result, the turbine and, consequently, the compressor are strongly accelerated. Subsequently, the turbine flow admission vanes are opened to assume the position providing the admission flow cross-section corresponding to the demanded stationary operating state of the internal combustion engine. The longer the turbine geometry is held in a closed position, that is, the longer maximum acceleration of the compressor is maintained, the greater the charge air pressure downstream of the compressor will be. However, the backup pressure ahead of the exhaust gas turbine increases substantially more rapidly than the charge air pressure so that, without suitable counter measures, an excessively high exhaust gas backup pressure is obtained. The high backup pressure requires increased piston energy for the discharge of the exhaust gases and results in gas change losses. This again results in a deterioration of the efficiency of the internal combustion engine.

DE 40 25 901 C1 discloses a method wherein, below a predetermined exhaust gas backup pressure value, the turbine geometry for adjusting the charge air pressure is controlled in accordance with a first performance graph and, upon exceeding the predetermined exhaust gas backup pressure value, in accordance with a second performance graph. The performance graphs are selected depending on the charge air pressure. The first performance graph corresponds to the actual change of the charge air pressure during the dynamic operating phase and the second performance graph corresponds to a fictive charge air pressure above the actual charge air pressure increase. The switching over between the performance graphs is provided for by a limit pressure switch with two setting capabilities which switch is subjected to the exhaust gas pressure, which changes the switch position when the given limit pressure is reached.

In order to achieve the rapid acceleration of the exhaust gas turbocharger and achieve thereby a steep charge air pressure increase, the turbine geometry is kept, in this known process, in a closing position until the exhaust gas pressure reaches the limit value and the limit pressure switch changes its switch position. When subsequently the turbine flow guide vanes are opened, the exhaust gas pressure drops whereupon the flow guide vanes are returned to a closing state as the exhaust gas pressure falls below the pressure limit value. With this control circuit the desired stationary operating state with a corresponding turbine geometry is finally obtained, but the exhaust gas pressure is maintained in the area of the limit value since the turbine geometry is switched back and forth as the exhaust gas pressure passes the given pressure limit. With the high exhaust gas back pressure and the charge air pressure building up comparatively slowly, there is an undesirably high pressure difference between the exhaust gas manifold and the intake manifold of the internal combustion engine which adversely affects the gas change process. The pressure difference between the exhaust gas and the charge air particularly in the early phase of the acceleration of the exhaust gas turbocharger is disadvantageous. But the known method includes no means for reducing the exhaust gas backup pressure for increasing the efficiency of the internal combustion engine and consequently, the fuel consumption.

It is the object of the present invention to provide a method of controlling the charge air mass flow of an internal combustion engine with an exhaust gas turbocharger having an adjustable turbine geometry by which, during a dynamic engine operation with a load change to a higher load stationary operating state of the internal combustion engine, the engine operating efficiency is improved.

SUMMARY OF THE INVENTION

In a method of controlling the charge air mass flow of an internal combustion engine having an exhaust gas turbocharger with adjustable turbine inlet guide vanes during dynamic operation of the engine from one stationary operating state with a given engine power output to another stationary engine operating state with increased engine power output, the flow guide vanes are first moved to a closing position providing a minimum flow cross-section and, after a certain engine operating parameter reaches a certain control value, the guide vanes are opened at a rate depending on the charge air pressure in the intake duct of the engine to a final opening position corresponding to the other stationary engine operating state.

After the flow guide vanes of the turbine have been moved to a closed position after a load increase has been demanded, the flow guide vanes are opened to the predetermined stationary engine operating position of the desired engine operating state at a rate which is proportional to the increase in the charge air pressure in the engine intake duct. During the dynamic operation while the engine load is changing, the guide vanes are basically in a position providing a smaller turbine admission flow cross-section than that which corresponds to the desired stationary engine operating state. As a result, the exhaust gas turbocharger is rapidly accelerated providing for an increased torque of the internal combustion engine. In the early dynamic operating phase, that is at the beginning of the load increase where the acceleration of the exhaust gas turbocharger is particularly important, the guide vanes of the turbine are kept essentially in their closed position so that the charge air pressure is rapidly increased. At the same time, a detrimental increase of the exhaust gas backup pressure is counteracted by controlling the guide vanes in dependence on the charge air pressure increase. With the increasing opening of the guide vanes, an increasing exhaust gas mass flow can pass through the turbine, which prevents a detrimental exhaust gas backup pressure ahead of the turbine. The rate of increase of the exhaust gas pressure is limited during the period in which the charge air pressure increases and the operating efficiency of the internal combustion engine in this operational phase is substantially increased.

The method of controlling the charge air mass flow will be described below in greater detail on the basis of the accompanying drawings.

BRIEF DESCRIPTION OF THE DRAWINGS

FIGS. 2a–2d are graphic representations showing the time dependent values of various engine operating parameters of the internal combustion engine utilizing the control for the charge air mass flow according to the invention.

DESCRIPTION OF A PREFERRED EMBODIMENT

Figure 1:
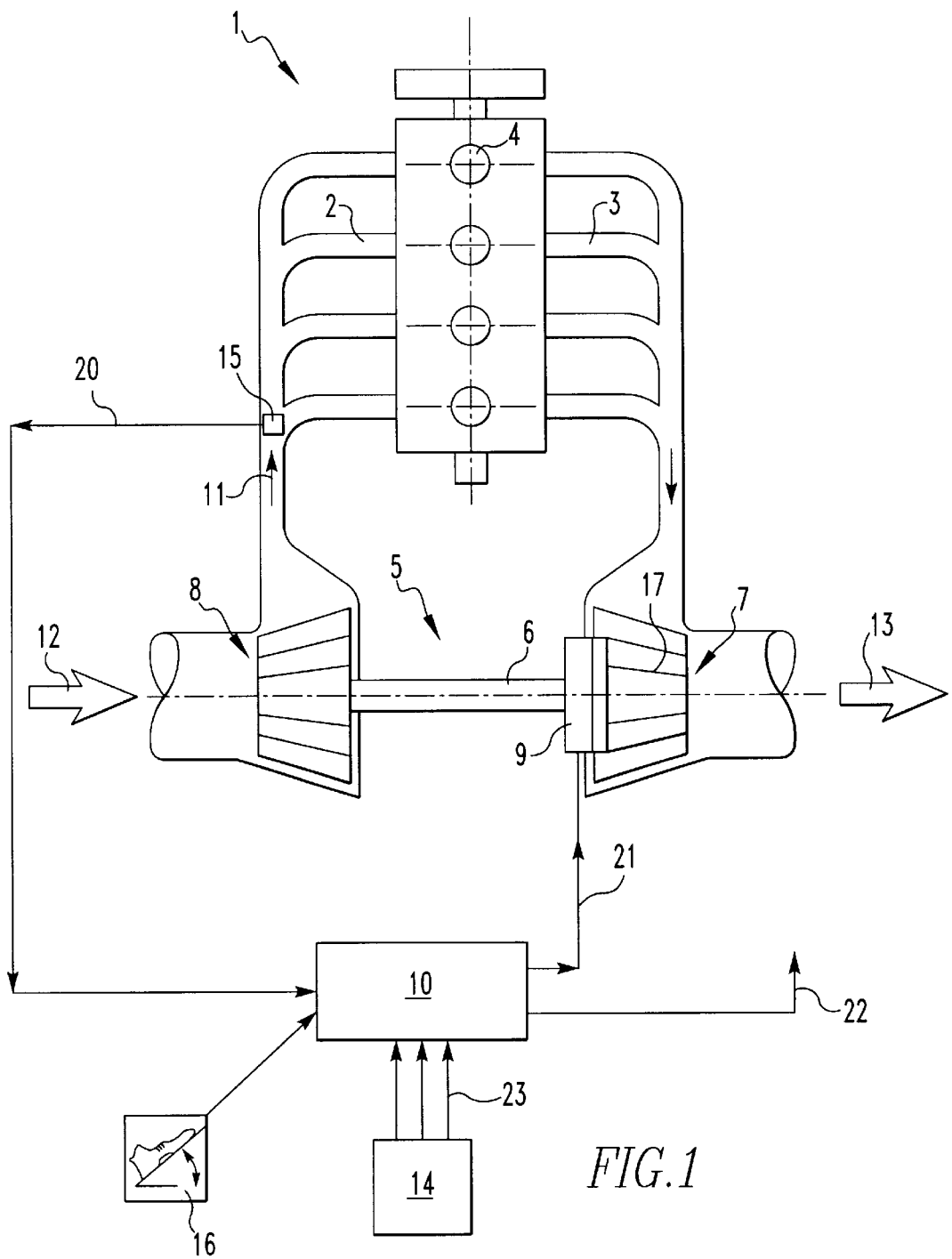
FIG. 1 shows schematically an internal combustion engine with an exhaust gas turbocharger operated in accordance with the method of the invention.

FIG. 1 shows an internal combustion engine 1 with an exhaust gas turbocharger 5 for generating a compressed charge air mass flow 11 in the intake duct 2 of the internal combustion engine 1. The exhaust gas turbocharger 5 comprises a turbine 7 which is arranged in the exhaust duct 3 of the internal combustion engine 1 and which is driven by the exhaust gas flow 13, and a compressor 8, which is disposed in the air intake duct 2. Both fluid dynamic machines (the turbine 7 and the compressor 8) are mechanically coupled by a common shaft 6 and operate therefore at the same speed. The energy of the exhaust gas flow 13 is transformed to the fresh air flow 12 inducted by the compressor 8 corresponding to the ratio between the exhaust gas back pressure ahead of the turbine 7 and the charge air pressure downstream of the compressor, that is, in dependence on the ratio of the respective flow cross-sections of the turbine 7 and the compressor 8.

In order to generate a charge air pressure which increases with increasing load of the internal combustion engine so as to generate a greater charge air mass flow, the admission flow cross-section of the turbine 7 can be reduced by an adjustable turbine geometry (adjustable vanes). A vane control device 9 acts on an adjustable guide structure 17 of the turbine 7, for example, adjustable guide vanes. In this way, an exhaust gas flow admission cross-section to the turbine 7 can be established, which, with the flow cross-section of the compressor 8, provides for a certain pressure transfer ratio with which a charge air pressure in the intake duct can be established as required for any given stationary operating state of the internal combustion engine 1. A control signal 21 is supplied to the vane control device 9 for adjusting the turbine geometry. The control signal 21 is generated by a control unit 10 depending on the load demand 16 for the internal combustion engine 1 as provided for example by a gas pedal. For each stationary operating state of the internal combustion engine 1, there is a certain flow admission cross-section of the turbine 7, which decreases with increasing load. With increasing back pressure in the exhaust gas flow 13 ahead of the turbine 7, the speed of the exhaust gas turbocharger 5 and accordingly the compressor output is increased. The setting of the guide vane structure 17 depending on a particular operating state of the internal combustion engine 1 and consequently, the flow admission cross-section of the turbine 7, are recorded in a performance graph 14 from which the control unit 10 retrieves the performance graph data 23 corresponding to the given load demand 16.

With a positive load change, that is when the load demand 16 increases, the guide vane structure is first moved to a closing position in which there is the smallest admission flow cross-section to the turbine 7. This results in a rapid acceleration of the exhaust gas turbocharger 5 and, consequently, in a rapid increase of the mass flow volume generated by the compressor 8.

The control signal 21 of the control unit is an electrical signal of a strength proportional to the control movement of the control device 9. The control device 9 operates the guide vane structure 17 of the turbine 7 for example pneumatically and includes a proportional valve, which controls the adjustment means of the guide vane structure 17 depending on the strength of the control signal 21. The control device 7, however, may also be an electric motor which executes the control movement proportional to the control signal 21 applied thereto. Subsequently, the guide vane structure 17 is continuously adjusted from the closing position to the given stationary operating position. The opening movement of the guide vane structure 17 in this process is proportional to the increase of the charge air pressure in the intake duct 2 of the internal combustion engine 1. A pressure sensor 15 is arranged downstream of the compressor 8 in the air intake duct of the engine and continuously generates a charge air pressure signal 20, which is supplied to the control unit 10. The control movement of the guide vane structure 17 out of its closing position to the stationary operating position of the demanded operating state of the internal combustion engine 1 as retrieved from the performance graph 14 is controlled depending on the charge air pressure at the compressor outlet before the beginning of the opening movement until the required operating state is reached.

Preferably, the guide vane structure 17 is not immediately moved out of its closing position, but is maintained in the closing position until a certain operating parameter of the internal combustion engine, which is continuously monitored, reaches a predetermined value. In this way, it is prevented that the combustion in the cylinders 4 of the internal combustion engine 1 takes place with insufficient air immediately after the load 16 is increased and the guide vanes 17 are moved to the closing position. During a load increase, the fuel amount to be injected increases and the air mass flow needs to be increased as rapidly as possible in order to generate in the cylinders 4 a fuel/air mixture with advantageous air values. With the guide vanes 17 in a closing position, and consequently, the flow admission cross-section of the turbine at a minimum, the largest possible acceleration of the exhaust gas turbocharger 5 can be obtained, In this way, the required charge air mass flow and the corresponding charge air pressure in the intake duct 2 are rapidly generated. The control unit determines, as operating parameter of the internal combustion engine 1, the momentary air ratio $\lambda$ from the charge air mass flow 11 and a fuel injection amount for each cycle of the internal combustion engine. The actual value of the charge air mass flow 11 is known to the control unit 10 from the charge air pressure signal 20. The fuel injection amount is controlled by an injection signal 22 which is generated by the control unit 10 by an injection signal 22 based on performance graph data 23 so that the control unit 10 knows also the actual fuel content in the fuel/air mixture. At the same time, a certain limit air ratio is retrieved from the performance graph which is taken as the desired value for the closing phase (closing position) of the guide vanes 17. Because of the rapid increase of the charge air pressure, the sensed air ratio $\lambda$ rapidly exceeds the given limit value whereupon the guide vanes are opened by the control unit 10 in a controlled manner.

The graphic representations of FIGS. 2a to 2d facilitate the understanding of the effects of the method for controlling the charge air mass flow 11. The figures show operating parameters of the internal combustion engine 1 presented over the operating time t during an increase of the load from one to another stationary engine operating state. There are four different operating phases a, b, c and d. The phases a and d are the stationary operating phases before and after a load change. The engine operating load is higher in the phase d; in the phases b and c, the charge air pressure in the intake duct of the internal combustion engine 1 is increasing, the charge air mass flow being controlled by changing the gas admission flow cross section of the turbine. FIG. 2a shows the control movement $S_{VTG}$ of the guide vanes of the turbine wherein $S_{max}$ is the maximum control movement at which the admission flow cross-section of the turbine is the smallest. During the operating phase a, the turbine guide vanes are in a position which is determined from the performance graph with a view to an optimal fuel consumption of the internal combustion engine. If now the load requirements are increased, the charge air flow is controlled by dynamic measures adjusting the turbine geometry of the exhaust gas turbocharger in the phases b and c until finally the required stationary operating state of the phase d with a control position $S_{des}$ of the guide vanes is achieved. In the operating phase d, the torque Md (FIG. 2b) and the charge air pressure $p_{2S}$ (FIG. 2d) are increased with respect to the operating phase a. At the instance of a load change, the guide vanes of the turbine are moved to their closing position and, at the same time, the fuel injection amount is increased. This provides for a sudden increase of the torque Md as represented by the curve shown in FIG. 2b. At the same time, the air ratio $\lambda$ of the mixture consisting of fuel and charge air drops as shown in FIG. 2c. The guide vanes are held during the operating phase b in a closing position wherein the control distance is maintained at $S_{max}$ such that the charge air pressure $p_{2s\text{-}act}$ (FIG. 2b) and consequently the air ratio $\lambda$ increase rapidly. When the air ratio $\lambda$ reaches a predetermined limit value as given in the performance graph which limit value is indicated in FIG. 2c by a broken line, the control unit causes the guide vanes to be opened in the operating phase c.

The control, that is, the adjustment of the guide vanes of the turbine, occurs in dependence on the strength of a control signal provided by the control unit 10. The time dependent value of the control signal corresponds qualitatively to the control movement of the guide vane structure and is shown in FIG. 2a as a dash-dotted line. The vane opening control movement is proportional to the increase in the charge air pressure $p_{2S}$ wherein the proportionality factor is defined by the ratio of the control movement to be performed between the closing position of the vanes and the demanded secondary position corresponding to the difference $\Delta I$ of the respective signal strength and the charge air pressure difference $\Delta p_{2S}$ until the required charge air pressure $p_{2S\text{-}des}$ is achieved. The charge air pressure difference $\Delta p_{2S}$, which is used as the basis for the control of the guide vanes and consequently the charge air mass flow, is determined by the original charge air pressure $p_{2SO}$ at the beginning of the opening movement of the guide vane structure. However, it is also possible to use, as the initial charge air pressure for determining the charge air pressure difference to be generated up to reaching the demanded stationary charge air pressure $p_{2\text{-}des}$, the charge air pressure which is present at the instance of the load increase before the closing of the guide vane structure. This results in a steeper increase of the charge air pressure $p_{2S}$ corresponding to the greater proportionately factor because of the greater charge air pressure difference $\Delta p_{2S}$ to be overcome during the opening movement of the guide vane structure.

The control signal generated by the control unit during the opening control phase t, that is the current value I thereof, is determined by the original charge air pressure and the instantaneous charge air pressure $p_{2s\text{-}act}$, which is determined by the pressure sensor in the intake duct of the internal combustion engine, for given performance graph control values (desired charge air pressure $p_{2s\text{-}des}$, maximum current value $I_{max}$ in the closing position of the flow guide vane structure and desired current value $I_{des}$ at the desired operating state) in accordance with the following equation:

$$I = I_{des} + (I_{max} - I_{des}) \cdot \frac{P_{2s-des} - P_{2s-act}}{P_{2s-des} - P_{2s0}}$$

As operating parameters for determining the duration of the closing phase b in which the guide vane structure is held in the closing state in a manner alternative to the air ratio λ, the fuel amount injected into the internal combustion engine per operating cycle may be determined. In this case, in the performance graph, a maximally possible fuel injection amount is assigned to each charge air pressure value $p_{2S-act}$ with which, at the momentary charge air mass flow rate, smoke-free burning mixtures can be formed. As the charge air pressure $p_{2S}$ increases while the guide vane structure is in a closing position, the fuel injection amount is also increased. When the charge air pressure has reached a value, which corresponds to the fuel injection volume for the respective stationary operating state of the internal combustion engine, the control unit initiates the controlled opening of the guide vane structure.

What is claimed is:

1. A method of controlling the charge air mass flow through an intake duct of an internal combustion engine having an exhaust gas turbocharger with adjustable-turbine geometry including guide vanes during dynamic operation of the engine from one stationary operating state with a given engine power output to another stationary engine operating state with a greater engine power output, comprising the steps of:

reducing the gas admission flow cross-section of the turbine by moving the turbine flow guide vanes to a closing position to provide a predetermined reduction in the turbine gas admission flow cross-section, determining a charge air pressure $p_{2S-act}$ in the intake duct of the internal combustion engine, and opening the flow guide vanes from their closed position to a predetermined opening position corresponding to said other stationary engine operating state at a rate which is proportional to the increase of the charge air pressure $p_{2S-act}$ from an initial charge air pressure ($p_{2SO}$) in the intake duct before the load change to a charge air pressure $p_{2S-des}$ corresponding to the desired other stationary operating state of the internal combustion engine.

2. A method according to claim 1, wherein said guide vanes are held in a closing position until a continuously monitored engine operating parameter reaches a predetermined control value.

3. A method according to claim 2, wherein as said engine operating parameter an actual air ratio λ of the charge air mass flow and a fuel injection amount is determined for each engine operating cycle and a predetermined limit air ratio is provided as said control value.

4. A method according to claim 2, wherein as said engine operating parameter a fuel injection amount is assigned to each charge air pressure which fuel injection amount increases with increasing charge air pressure and a predetermined fuel amount corresponding to the desired other stationary operating state of the engine is used as said control value.

5. A method according to claim 1, wherein said control values are stored in a performance graph and are taken from said performance graph during engine operation.

* * * * *